April 28, 1942.                E. V. BOREL                2,281,408
METHOD AND APPARATUS FOR MANUFACTURE AND TREATMENT OF
              GLASS AND ANALOGOUS SUBSTANCES
                    Filed Feb. 11, 1939

INVENTOR
EDOUARD VIRGILE BOREL
BY
ATTORNEYS

Patented Apr. 28, 1942

2,281,408

UNITED STATES PATENT OFFICE 2,281,408

METHOD AND APPARATUS FOR MANUFACTURE AND TREATMENT OF GLASS AND ANALOGOUS SUBSTANCES

Edouard Virgile Borel, Romont, Switzerland, assignor to Societe Anonyme des Manufactures des Glaces & Produits Chimiques de Saint-Gobain, Chauny & Cirey, Paris, France Application February 11, 1939, Serial No. 255,829
In Great Britain February 14, 1938

18 Claims. (Cl. 13—6)

It is known that the manufacture of glass or analogous products generally includes a series of thermal operations such as melting, refining, and bringing to the working temperature, these operations differentiating, in particular, from one another, by the temperatures they require.

In so-called continuous methods these various operations are performed in successive zones of the same basin or tank, the introduction of the raw materials and the removal of glass taking place, in a practically continuous manner, at the two ends of the furnace, respectively. In such a furnace, the glass level is constant and at each point the temperature conditions do not vary as a rule.

In the case of discontinuous methods, on the contrary, the whole of the contents of the vessel is subjected to the same thermal operation, and the glass is utilized only after the whole of the contents of the vessel has been brought into the desired final state. Therefore, in this case, the various operations take place successively, the matter to be treated being loaded, then melted and refined, for instance during the night, while the glass is extracted during day-time. In such a method of manufacture, the glass level varies considerably and the temperature of the whole of the glass mass undergoes variations corresponding to the various operations which are to be performed.

The present invention relates to glass manufacturing methods of this last mentioned type, that is to say discontinuous methods.

One of the objects of the present invention is to provide a novel discontinuous method for the manufacture or treatment of glass and similar materials.

Another object of the invention is to provide a novel discontinuous method for the manufacture or treatment of glass in which the heating is effected by means of an electrical current supplied by electrodes, said current flowing through the mass of the glass which is thus utilized as a resistance.

A further object is to provide novel apparatus for carrying out the method of the invention.

An essential feature of the present invention consists in heating the mass of glass by means of an electric current flowing through the glass mass and supplied to it by two or more electrodes which are arranged in such manner that the portion of these electrodes which is intended to be in contact with the glass is localized in the lower part of the vessel. Owing to this arrangement the area of the electrodes which is in contact with glass does not vary when the level of glass, in the course of the loading and melting operations, rises from the level below which the active surface of the electrodes is located.

In this way, when the level of the mass of glass rises in the vessel, the surface of contact of the electrodes with the glass does not undergo any variation, whereas the section afforded by the bath for the passage of the current increases. This increase of section produces, if the feed voltage is uniform, a corresponding increase of the intensity. On the other hand, as the area of the surface of contact between the electrodes and the bath does not vary, the current density on the surface of the electrode increases also. This corresponds to a rise of temperature in the localized zones constituted by the portions of the bath which surround the electrodes. On the contrary, in the portion of the bath located between electrodes, as the increase of intensity is accompanied by an increase of the section afforded for the passage of the current, the current density does not increase to the same degree as in the zones surrounding the electrodes and even, in some cases, it decreases. It follows that the temperature produced in the mass of glass, which is chiefly dependent upon the value of the current density, increases in the zones adjoining the electrodes, as the glass level rises, at a relatively high rate, whereas in the parts of the bath existing between these zones the temperature rises much more slowly or even decreases in some cases. This increase of temperature in well determined zones and the localization of this increase of temperature to these zones will reach their maximum effect when the glass reaches its highest level, that is to say when, the melting being finished, refining should begin. The refining of glass, which is the essential operation in the manufacture of glass, therefore takes place in particularly favorable conditions, both from the point of view of the quality of glass and from an economical view-point. The reduction of the cost of manufacture results from the fact that glass is brought to the high temperature that is necessary for its refining only in zones of relatively small volume as compared to that of the whole mass of glass. Furthermore, as these zones are located at the bottom part of the furnace, they facilitate the formation of convection currents which are capable of bringing the whole of the mass of glass into the hot zones and of causing said mass to pass through the very high temperature existing therein. Furthermore, the glass can be heated in the zones surrounding the electrodes to a very high temperature, much higher than that usually employed for refining, and consequently the time necessary for refining may be reduced.

Other features of the present invention will result from the following detailed description of some specific embodiments thereof.

Preferred embodiments of the present invention will be hereinafter described, with reference to the accompanying drawing, given merely by way of example, and in which:

Fig. 4 is an horizontal sectional view corresponding to Fig. 3;

Figure 1:
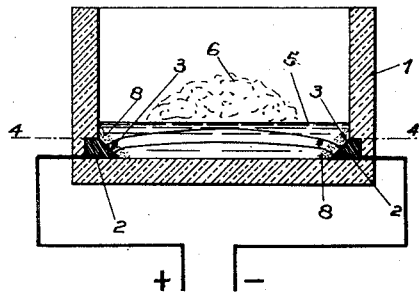
Fig. 1 is a sectional view of a furnace made according to the present invention, shown after the glass precedingly manufactured has been removed and a first charge has been poured in the furnace for a new melting operation.
Figure 2:
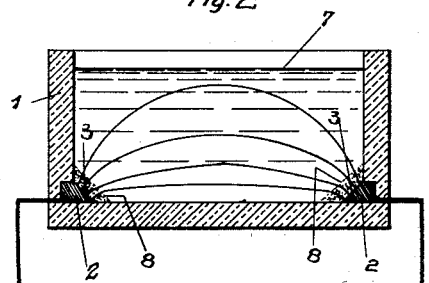
Fig. 2 shows the same furnace at another time of the cycle of operations, for instance at the end of the melting.

In the embodiment of Figs. 1 and 2, reference numeral 1 designates the vessel or container, 2 the electrodes which, according to the present invention, have their surfaces 3, intended to be in contact with glass, disposed below a horizontal plane 4 located at a relatively small distance above the bottom of the vessel.

Fig. 1 shows the vessel before the beginning of a new melting operation. After the preceding melting operation, I leave purposely, on the bottom of the vessel, a quantity of glass capable of constituting between the electrodes a conducting mass 5 sufficient for being heated by the passage of current. The first charge 6 of the matters to be melted for the formation of glass is deposited on this conducting mass. This glass layer initially left on the bottom of the vessel may be of relatively low height since the electrodes do not extend above level 4, which is located near the bottom of the vessel.

In Fig. 1, I have shown an initial glass layer which fulfills these conditions. When the raw materials are not yet vitrified, these raw materials 6 float on the glass layer 5, as shown by the drawing. The heating of these materials results from their contact with the melted glass layer 5 heated by the passage of electric current therethrough.

It should be noted that the area through which current is fed to layer 5 already has, at the beginning of the melting operation, the total value provided for the current feed to the vessel in all the working stages. Therefore, this area is of substantial value and permits of introducing a current of relatively high intensity. On the other hand, due to the relatively small height of the glass bath, the section through which current flows from one electrode to the other is of minimum value and it can average the area of the surface of contact of the electrodes with the mass of glass, so that the current density in the glass layer 5 can be substantially the same as that existing in the vicinity of the electrodes. It follows that the temperature of layer 5 can be high throughout the whole of said layer. This circumstance is particularly advantageous for obtaining a regular melting of the mass because, due to the low height of layer 5 and its comparatively low temperature prior to the beginning of the melting operation, it is hardly possible to rely upon the formation of horizontal glass currents to render uniform the heating action of layer 5 on the raw materials.

Fig. 2 shows the furnace at the end of the melting of the whole of the raw materials which have been fed by successive amounts on the surface of the bath. As it results from this figure, the glass level has come to 7. The section afforded by the mass of glass to the flow of current has become much larger than at the beginning of the melting operation (Fig. 1), the resistance of the whole of the furnace has decreased, and if the feed voltage has remained the same, the intensity absorbed by the furnace is much higher. But as the surface of contact 3 of the electrodes has not varied, this increase of intensity corresponds to an increase of the current density in the glass zones which surround the electrodes. On the other hand, this increase of intensity in the portions existing between the electrodes is accompanied by an increase of the section through which the current flows, so that the current density in these portions does not increase as much as in the zones surrounding the electrodes, and even, in some cases, it may decrease.

It results from the preceding explanations that there is created, in the mass of glass, a plurality of zones of very high temperatures, limited to some parts of the bath, which are the parts surrounding the electrodes and shown at 8 in Fig. 2. These zones of very high temperature are very favorable for the obtainment of a good refining.

Furthermore, the convection currents which, in this case, are necessary for giving the whole of the bath the advantage of the very high temperature obtained in the zones adjacent to the electrodes, are facilitated by the fact that there is a substantial height of glass above these hot zones 8.

Figure 3:
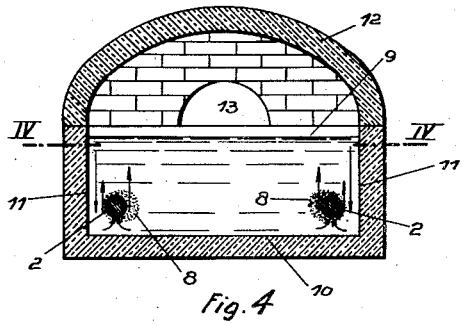
Fig. 3 is a vertical sectional view corresponding to another embodiment.

Figs. 3 and 4 relate to an embodiment of the invention according to which, in order to facilitate the movements of glass, and, in particular, its passage through the zones adjoining the electrodes, the latter are spaced apart both from the bottom of furnace 1 and from the lateral walls thereof. In this way, the glass which is close to the walls of the furnace is not located over the hot zones 8 produced by the electrodes, so that this glass, which, of course, tends to be cooled as a consequence of its vicinity with the walls, is not acted upon by the upward movement of the hot glass and can come down to a level below the electrode and be heated by contact therewith. The upward currents of hot glass and the downward currents of cold glass do not interfere with one another and a particularly active circulation is obtained, which facilitates not only the heat exchanges but also the mechanical stirring of the mass of glass so as to render it more homogeneous.

In Fig. 3, I have shown at 9 the level of glass corresponding for instance to the end of melting or to the refining operations, at 2 the electrodes, at 10 the hearth of the furnace, at 11 the walls thereof. As shown by the drawing, each electrode, while being located in the lower part of the furnace is, according to the invention, at a distance from hearth 10 and from the corresponding lateral wall 11. The arch of the furnace as shown at 12 and 13 is an aperture through which the matters to be treated can be introduced or the finished glass can be removed. In the embodiment shown by the drawing, the electrodes 2 are in the same horizontal plane and extend along the whole width of the furnace.

Furthermore, in Figs. 3 and 4, the electrodes are located at both ends of the furnace in such manner as to obtain a direct heating action which extends over most of the bottom surface of the furnace.

Of course, other electrodes might be provided between electrodes 2. The case of more than two electrodes can be considered, in particular, for the feed of poly-phase currents and, for instance, three-phase current.

Figure 5:
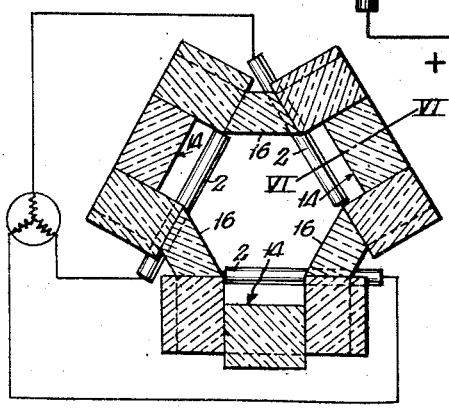
Fig. 5 is a horizontal sectional view of still another embodiment.
Figure 6:
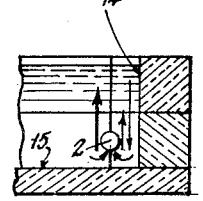
Fig. 6 is a transverse sectional view corresponding to Fig. 5.

Figs. 5 and 6 show an embodiment of the invention in the case of three-phase currents. The furnace, as seen in plane view, is of hexagonal shape. It is fitted with three electrodes 2 arranged along three non-consecutive sides of this hexagon. Walls 14 are parallel to the electrodes, and at a distance therefrom. Also, the bottom of the furnace, 15, is at a distance below electrodes 3. Concerning the convection currents, the same results as above indicated with reference to Figs. 3 and 4 are obtained.

It has been found that a suitable value for the interval between the electrode and the wall of the furnace, as well the lateral wall as the bottom of said furnace, is 15 centimeters.

One of the advantages of the arrangement shown by Figs. 5 and 6 is that the walls 16 of the furnace between the electrodes are plane surfaces. The absence of any projection or recess improves the preservation of these walls which are in contact with parts of the bath through which the electric current flows.

It should be well understood that the present invention is applicable as well to tank-shaped vessels which may be of large size, such as those commonly called day-tanks, as to smaller pot-shaped vessels. In both of these cases, it may be necessary or desirable for making use of the finished glass, to move the vessel and to incline it, for instance for pouring said glass into utilization or treatment vessels. For this operation, the apparatus should be designed in such manner as to permit of detaching the electrodes from the conductors through which electric current is fed to the furnace.

These electrodes can be made of graphite since, in the course of the various operations, they can always be kept covered with molten matter, that is to say protected against the action of air. In Figs. 3 to 6, the electrodes have been shown as made of a single element extending substantially from one end to the other of the furnace, and which are introduced into the inside of the furnace through holes provided in the lateral walls of the vessel. Instead of this arrangement, each electrode may be constituted by two elements located in line with each other, and introduced into the furnace through opposite apertures provided in the lateral walls thereof, so as to meet each other or come very near to each other, on the inside of the furnace.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. In a furnace for the discontinuous manufacture and treatment of glass and the like, in which the period of introduction of the material into the furnace is distinct from that of the extraction of the finished material, the time elapsing between these two periods being used for the treatment of the material, the entire content of the furnace being subjected at the same time to the same thermic operation, in combination, a vessel having, in vertical projection, the shape of a hexagon, and three electrodes in said vessel adapted to be fed with three-phase electric current for heating the molten matter which is present in said vessel and which acts as a resistance, said electrodes having the form of rod extending substantially horizontally along three non-consecutive lateral walls of said vessel and in the lower part thereof, and being spaced apart from the lateral walls and from the bottom of said vessel.

2. In apparatus of the class described, a rectangular vessel for containing a molten mass of glass making materials, and means for subjecting said mass to varied heating effects as the level of the mass is varied, said means including a pair of rod-like electrodes in said vessel mounted adjacent and spaced from the bottom and two opposed side walls thereof and extending substantially the entire length of the vessel between the other two side walls thereof, and means for connecting said electrodes to opposite terminals of a source of electrical energy, the surface areas of said electrodes in contact with said mass being so proportioned with relation to the size of said vessel that when the level of the mass is relatively low the electrical current distribution in the mass between the electrodes approaches uniformity and becomes highly concentrated in the immediate vicinities of said electrodes for producing high intensity heat zones in said vicinities when the level of the mass is relatively high in said container.

3. In apparatus of the class described, a container for glass making materials, and means for heating said materials to reduce the same to a molten mass and for subjecting said mass to varied heating effects as the level of the mass is varied, said means including a source of electrical energy, a plurality of elongated electrodes in said container adjacent the bottom thereof and extending substantially the entire length of the container adjacent opposed side walls thereof, and means for connecting the electrodes on opposite sides of the vessel to opposite terminals of said source, the surface areas of said electrodes in contact with said mass being sufficiently small so that when the level of said mass is relatively high in said container the greatest electrical current concentration in said mass occurs adjacent said electrodes, thereby creating high intensity heat zones adjacent the latter, the temperature in said zones being higher than in other portions of said mass.

4. In apparatus of the class described, a container for glass making materials, and means for heating said materials to reduce the same to a molten mass and for subjecting said mass to varied heating effects as the level of the mass is varied, said means including a source of electrical energy, a horizontally disposed rod-like electrode mounted in said container adjacent each of a plurality of the side walls thereof and adjacent the bottom thereof, and means for connecting the electrodes at different sides of said container to different terminals of said source, the surface areas of said electrodes in contact with said mass being such that when the level of the mass is immediately above the uppermost portion of said electrodes the electrical current distribution in the mass between the electrodes approaches uniformity and becomes highly concentrated in the immediate vicinity of said electrodes for producing high intensity heat zones in said vicinities when the level of the mass is relatively high in said container.

5. In a method for the discontinuous manufacture of glass, the steps of filling the chamber of a glass making furnace relatively full of molten glass making materials, passing electrical currents through said materials to heat the same, and controlling the distribution of said electrical currents in said mass to create restricted high intensity heat zones in said mass extending substantially the entire length of said chamber adjacent the bottom and opposed side walls thereof and to heat the portion of the mass between said zones to a lesser degree.

6. Glass making apparatus of the class described comprising a refractory container for glass making materials and means for heating said materials to reduce the same to a molten mass and for subjecting said mass to varying heating effects as the level of the mass in the container rises, said means including a plurality of rod-like electrodes of different polarities disposed adjacent the bottom of said container with the longitudinal axes thereof substantially horizontal, said electrodes being spaced from and extending substantially the entire length of non-consecutive side walls of said container, the surface areas of said electrodes in contact with the molten mass being sufficiently small so that restricted high intensity heat zones are created around said electrodes when the level of the molten mass is at its normal operating maximum in said container, the temperatures in said zones being sufficiently high to effect refining of said molten mass.

7. In glass making apparatus of the class described, a container for glass making materials and means for heating said materials to reduce the same to a molten mass in said container including a plurality of elongated rod-like electrodes connected to different terminals of a source of electrical energy, each of said electrodes being disposed adjacent the bottom and a side wall of said container, the surface area of each of said electrodes in contact with the molten mass being such that a restricted zone of high heat intensity in said mass will be present around the same when the level of the mass reaches a normal operating maximum, the temperature in said zone being higher than in other portions of the molten mass and high enough to effect refining of said mass.

8. Glass making apparatus of the class described comprising a refractory container for glass making materials, and means for heating said materials to reduce the same to a molten mass and for subjecting said mass to varying heating effects as the level of the mass in the container rises, said means including a plurality of elongated electrodes of different polarities disposed in said container with the uppermost surfaces thereof relatively near the bottom of the container and with the longitudinal axes thereof substantially parallel to the adjacent side walls of the container, the surface areas of said electrodes in contact with the molten mass being sufficiently small so that restricted high intensity heat zones are created in the immediate vicinity thereof when the level of the molten mass is at its normal operating maximum in said container.

9. In a discontinuous glass making furnace, a container for glass making materials, and means for heating said materials to reduce the same to a molten mass, said means including a plurality of elongated electrodes connected to different terminals of a source of electrical energy, each of said electrodes being disposed adjacent the bottom and a side wall of said container, the thickness of the molten mass above the uppermost surface of each of said electrodes being several times greater than the vertical thickness of the electrode when the level of the mass is at its normal operating maximum, and the surface area of each of said electrodes in contact with the molten mass being sufficiently small in comparison to the cross sectional area of the mass between cooperating electrodes that a restricted zone of high heat intensity will be present in the immediate vicinity of each electrode when the level of the mass is at its normal operating maximum in the container.

10. A glass making furnace adapted for the discontinuous manufacture of glass comprising a refractory container having a plurality of bays connected by side walls, and an electrode extending entirely across the mouth of each of said bays adjacent the bottom of the container, said electrodes being adapted to be connected to different terminals of a source of electrical energy.

11. A discontinuous glass making furnace comprising a refractory container having a plurality of bays connected by side walls, and elongated rod-like electrodes of different polarities extending across the mouths of said bays adjacent the bottom of the container, the surface area of each of said electrodes in contact with the glass mass in said container being sufficiently small so that a restricted high intensity heat zone is formed entirely around the same when the glass mass is at its normal maximum operating level in said container.

12. A glass making furnace of the discontinuous type comprising a refractory container having a plurality of bays disposed around a central chamber and communicating therewith, and an elongated electrode of small periphery extending across each of said bays adjacent the bottom of the container, the depth of said container being several times greater than the vertical thicknesses of said electrodes.

13. In a method of manufacturing glass in a container fitted with electrodes located near the bottom thereof, the steps of causing a flow of electrical current between said electrodes through a molten glass mass of comparatively small cross-section, the density of said electrical current being substantially uniform throughout said mass, adding raw glass materials to said molten glass means to be melted while maintaining the voltage of the source of said electrical current substantially constant thus causing the electrical current density in restricted zones adjacent said electrodes to become substantially greater than in the remaining parts of the molten glass mass as the cross-sectional area of the latter between the electrodes increases, continuing the flow of said current without substantially altering said voltage until the molten glass mass is refined, and then removing a major portion of the refined glass mass, the surfaces of the electrodes in contact with the glass mass remaining substantially constant and immovable during the melting and refining steps.

14. In a method of manufacturing glass in a container fitted with electrodes located near the bottom thereof, the steps of causing a flow of electrical current between said electrodes through a molten glass mass of comparatively small cross-sectional area in contact with said electrodes, the density of said electrical current being substantially uniform throughout said mass, maintaining the voltage of the source of said electrical current substantially constant while adding raw glass materials to the molten mass to be melted until a molten glass mass of comparatively large cross-sectional area is provided and thereby increasing the density of the electrical current in restricted zones adjacent the electrodes as said cross-sectional area increases, heating said glass mass of comparatively large cross-sectional area by continuing the flow of said electrical current therethrough without substantially altering said voltage until said mass is refined, removing a major part of the refined glass mass, the cross-sectional area of the remaining glass mass being at least equal to said comparatively small cross-sectional area, and then repeating the method, the surfaces of the electrodes in contact with the glass mass remaining immovable and substantially constant throughout the process.

15. In a method for the discontinuous manufacture of glass, the steps of supplying a relatively small mass of molten glass making materials to the chamber of a furnace, passing electrical current through said molten materials to heat the same, the density of said electrical current being relatively uniform throughout said mass when the latter is relatively shallow, adding raw glass making materials to said mass and melting the same to increase the depth of the molten mass until said chamber is filled to a desired relatively high level while increasing the density of electrical current in restricted zones of said mass adjacent the bottom and side walls of the chamber in relation to the density of the electrical current in the remainder of the mass outside of said zones and thereby creating restricted high intensity heat zones in said mass, and maintaining said level until the entire molten mass is refined.

16. In a method for the discontinuous manufacture of glass, the steps of melting raw glass making materials in the chamber of a glass making furnace until said chamber is filled to a relatively high level with a molten mass, passing electrical current through said mass to heat the same, controlling the distribution of said electrical current in said mass to create restricted high intensity heat zones adjacent the bottom and side walls of said chamber wherein the temperature of the mass is higher than the temperature of the remaining portion of the mass and to heat said remaining portion of the mass to a lesser degree, the temperature of the mass in said high intensity heat zones being sufficiently high for refining the mass, and retaining all of said mass in said chamber until the whole of the mass is refined.

17. In a method of manufacturing glass in a container fitted with electrodes located near the bottom thereof, the steps of causing a flow of electrical current between said electrodes through a molten glass mass of comparatively small cross-section, the density of said electrical current being substantially uniform throughout said mass, adding raw glass materials to said molten glass mass to be melted and causing the electrical current density in restricted zones adjacent said electrodes to become substantially greater than in the remaining parts of the molten glass mass as the cross-sectional area of the latter between the electrodes increases, continuing the flow of said current until the molten glass mass is refined, and then removing a major portion of the refined glass mass, the surfaces of the electrodes in contact with the glass mass remaining substantially constant and immovable during the melting and refining steps.

18. In a method of manufacturing glass in a container fitted with electrodes located near the bottom thereof, the steps of causing a flow of electrical current between said electrodes through a molten glass mass of comparatively small cross-sectional area in contact with said electrodes, the density of said electrical current being substantially uniform throughout said mass, adding raw glass materials to the molten mass to be melted until a molten glass mass of comparatively large cross-sectional area is provided and thereby increasing the density of the electrical current in restricted zones adjacent the electrodes as said cross-sectional area increases, heating said glass mass of comparatively large cross-sectional area by continuing the flow of said electrical current therethrough until said mass is refined, removing a major part of the refined glass mass, the cross-sectional area of the remaining glass mass being at least equal to said comparatively small cross-sectional area, and then repeating the method, the surfaces of the electrodes in contact with the glass mass remaining immovable and substantially constant throughout the process.

EDOUARD VIRGILE BOREL.